United States Patent
Götz

(10) Patent No.: US 6,561,326 B2
(45) Date of Patent: May 13, 2003

(54) AMPLITUDE-ATTENUATING DASHPOT

(75) Inventor: Dipl.-Ing. Ole Götz, Hamburg (DE)

(73) Assignee: Krupp Bilstein GmbH, Ennepetal (DE)

( * ) Notice: Subject to any disclaimer, the term of this patent is extended or adjusted under 35 U.S.C. 154(b) by 0 days.

(21) Appl. No.: 09/809,909

(22) Filed: Mar. 16, 2001

(65) Prior Publication Data

US 2001/0037922 A1 Nov. 8, 2001

(30) Foreign Application Priority Data

| May 4, 2000 | (DE) | 100 21 767 |
| Sep. 27, 2000 | (DE) | 100 47 878 |
| Jan. 25, 2001 | (EP) | 011 01 597.1 |

(51) Int. Cl.$^7$ ................................ F16F 9/34
(52) U.S. Cl. ..................... 188/322.15; 188/282.5; 188/282.8; 188/316
(58) Field of Search ................. 188/320, 316, 188/297, 266.1, 266.5, 282.1, 282.4, 282.5, 282.6, 282.8, 322.15, 317; 267/140.13, 140.14, 140.11

(56) References Cited

U.S. PATENT DOCUMENTS

| 4,535,877 A | * | 8/1985 | Shimokura ............... 188/282.4 |
| 4,723,640 A | * | 2/1988 | Beck ....................... 188/282.3 |
| 4,765,446 A | * | 8/1988 | Murata et al. ........... 188/284.4 |
| 5,096,025 A | * | 3/1992 | Herberg ................... 188/266.5 |
| 5,226,512 A | * | 7/1993 | Kanari .................... 188/282.2 |
| 6,220,409 B1 | * | 4/2001 | Deferme ................ 188/322.15 |

FOREIGN PATENT DOCUMENTS

| JP | 2-142941 A | * | 6/1990 |
| JP | 7-190125 A | * | 7/1995 |

* cited by examiner

Primary Examiner—Matthew C. Graham
Assistant Examiner—Mariano Sy
(74) Attorney, Agent, or Firm—Max Fogiel

(57) ABSTRACT

A device for attenuating the amplitudes of impacts, especially against the wheel of a vehicle. At least one piston is accommodated in a housing and divides it into two attenuating spaces. The piston is attached to a piston rod and operates in conjunction with a component that handles smaller amplitudes. This component is either a diaphragm or a displaceable rigid disk that divides a space and communicates hydraulically with either the upper or with the lower attenuating space.

19 Claims, 4 Drawing Sheets

AMPLITUDE-ATTENUATING DASHPOT

BACKGROUND OF THE INVENTION

The present invention concerns a device for attenuating the amplitudes of impacts, especially impacts against the wheel of a vehicle, with at least one piston that is accommodated in a housing and divides it into two attenuating spaces, that is attached to a piston rod, and that operates in conjunction with a hydraulically parallel component that handles smaller amplitudes.

Generally, the motion of the piston rod is attenuated rather weak for smaller amplitudes, allowing the extent of attenuation to be handled only by way of the impedances in the fluid-conveying channels.

European Patent A 0 848 182 describes a dashpot for vehicle wheels that operates in conjunction with a specific component in order to handle smaller amplitudes. The patent proposes a solution that involves an elastomeric component in the vicinity of the piston at the inner circumference and accommodating weaker wheel impacts. This attenuating component, preferably a ring, dynamically communicates with both an upper and a lower attenuating space by way of fluid-conveying channels. The two faces of the piston are demarcated by sliding valves. When the impacts are weak, hydraulic fluid can flow down toward the attenuating component and accordingly equilibrate smaller amplitudes essentially with no attenuation. The valves come into play conventionally when the flow is more powerful. There is a drawback to this approach. The piston must be precisely machined to accommodate the elastic elastomeric ring, and the incoming and outgoing fluid-conveying channels must be mechanically introduced subsequently.

SUMMARY OF THE INVENTION

The object of the present invention is to improve the prior art to the extent that the attenuation of vibrations with small amplitudes will be weak and will come into play only once the motions of the piston inside the cylinder are extensive. The piston itself will be conventional.

This object is attained by the characteristics recited in claim 1.

Advantageous and advanced embodiments will be evident from the subsidiary claims.

The object of the present invention accordingly features a space divided into subsidiary spaces by a diaphragm or by a solid sliding disc and hydraulically communicating parallel to the dashpot with the lower and/or upper attenuating space. The subsidiary spaces produced by the diaphragm or disc are designed to allow hydraulic fluid from their associated attenuating spaces to flow against them. It accordingly becomes possible for the subsidiary spaces demarcated by the diaphragm or disc to act outside the piston as equilibrating spaces with respect to slight motions thereof. The particular equilibrating space, or demarcated subsidiary space, can be charged with hydraulic fluid from the top or bottom through apertures similar to those in a sieve for example with essentially no attenuation taking place until the diaphragm or disc comes to rest against one of the two opposing and preferably curved walls of its associated subsidiary space. This measure results in a relatively unattenuated motion in the vicinity of smaller amplitudes. Not until these short routes have been exhausted will the actual attenuation typical of the prior art, specifically by way of the known sliding valves, come into play.

Behavior during the transition to hard attenuation can be controlled by varying the geometry of the particular subsidiary space and its components and their intakes, the rigidity of the diaphragm, and the position of the apertures for instance, and the transition will be smoother.

BRIEF DESCRIPTION OF THE DRAWINGS

One embodiment of the present invention will now be specified by way of example with reference to the accompanying drawing, wherein.

DESCRIPTION OF THE PREFERRED EMBODIMENTS

Figure 1:
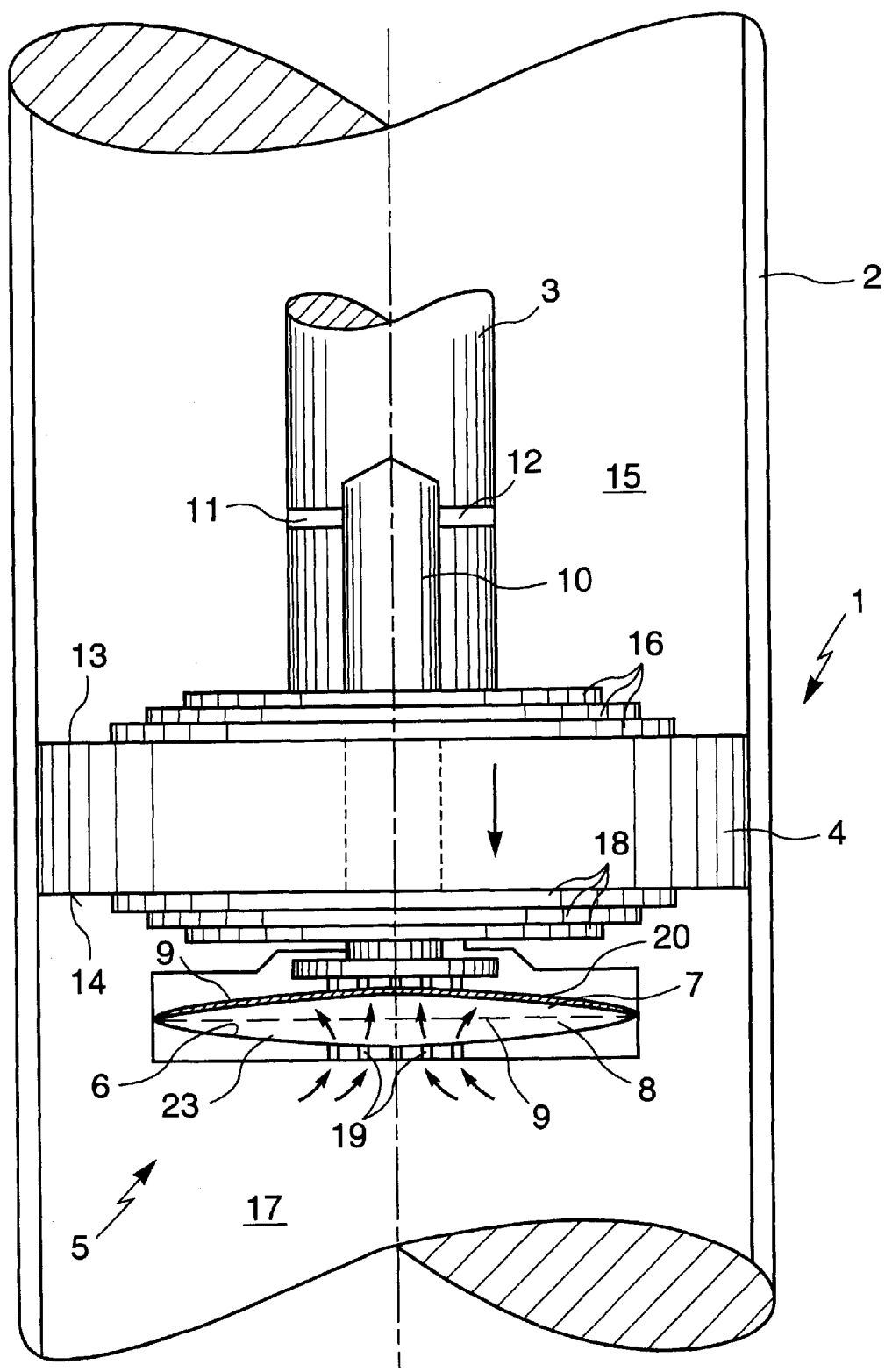
FIG. 1 is a schematic illustration of a dashpot with a piston and with a component that handles smaller amplitudes during the downward stroke.
Figure 2:
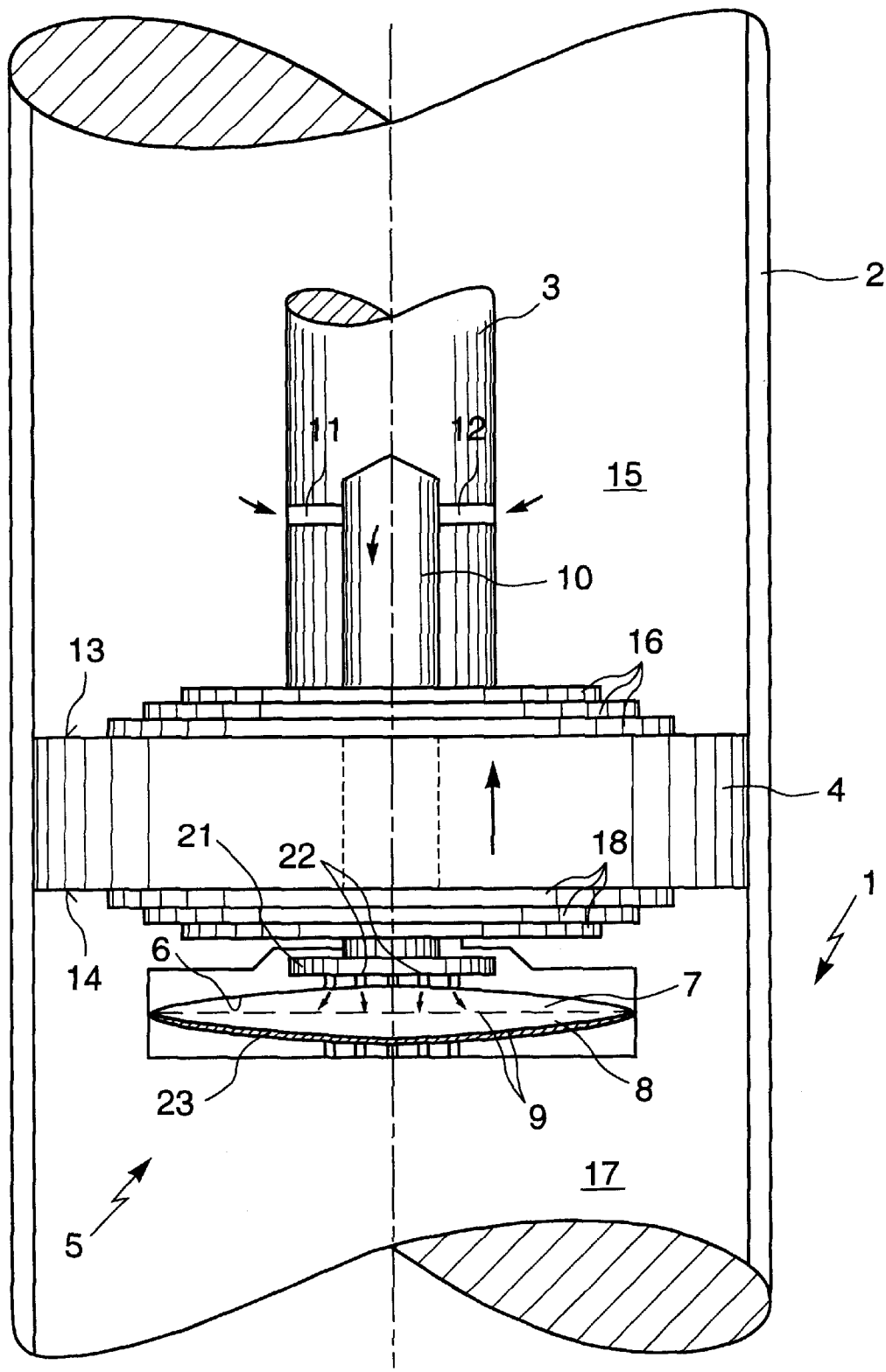
FIG. 2 is an illustration similar to FIG. 1 but with the piston executing an upward stroke.

FIGS. 1 and 2 illustrate a device 1 in accordance with the present invention, specifically a one-cylinder dashpot, although a two-cylinder dashpot could just as well be employed. Device 1 includes a cylindrical dashpot housing 2 accommodating a piston 4 attached to a piston rod 3. Also depicted is a component 5 that can handle smaller amplitudes. Component 5 is a diaphragm 9, represented in midposition by the broken line, that divides a space 6 into two subsidiary spaces 7 and 8. Piston rod 3 is provided with a blind bore 10. Bores 11 and 12, open at both ends, extend radially into bore 10 from the surface of piston rod 3. Piston 4 is provided with an upper face 13 and a lower face 14 and operates in conjunction with a valve composed of several discs 16 in the vicinity of an upper attenuating space 15. A similar valve, composed of several discs 18 is accommodated in a lower attenuating space 17.

FIG. 1 illustrates piston 4 during its downward stroke, in the range, that is, of smaller amplitudes, meaning less displacement on the part of piston 4. During this phase, the hydraulic fluid is conveyed into subsidiary space 8 through apertures 19 similar to those in a sieve, deforming diaphragm 9, made of an elastomer in this particular embodiment, toward the opposing curved wall 20 of subsidiary space 8. Once diaphragm 9 has come to rest against wall 20 as represented in FIG. 1, discs 18 will conventionally assume the task of further attenuation.

FIG. 2 represents piston 4 during its upward stroke. The components are labeled with the same reference numbers employed in FIG. 1.

The rising piston 4 forces the hydraulic fluid in upper attenuating space 15 into bore 10 through bores 11 and 12 and hence into an annular space 21 in component 5 through further apertures 22, also similar to those in a sieve, that extend into space 6 and in particular into subsidiary space 7 from annular space 21. As long as the upward displacement remains minor, the expelled hydraulic fluid will impact diaphragm 9, which will accordingly deform elastically toward the opposing wall 23 of subsidiary space 8. The figure depicts diaphragm 9 resting against wall 23, whereupon the conventional attenuation process is initiated.

Behavior during the transition to harder attenuation can be controlled by varying the geometry of space 6 and of walls 20 and 23, the rigidity of diaphragm 9, and the position of apertures 19 and 22, allowing a smoother transition in accordance with the present invention. Diaphragm 9 will, as it stretches toward the walls, block the apertures not all at once but only some at a time.

Figure 3:
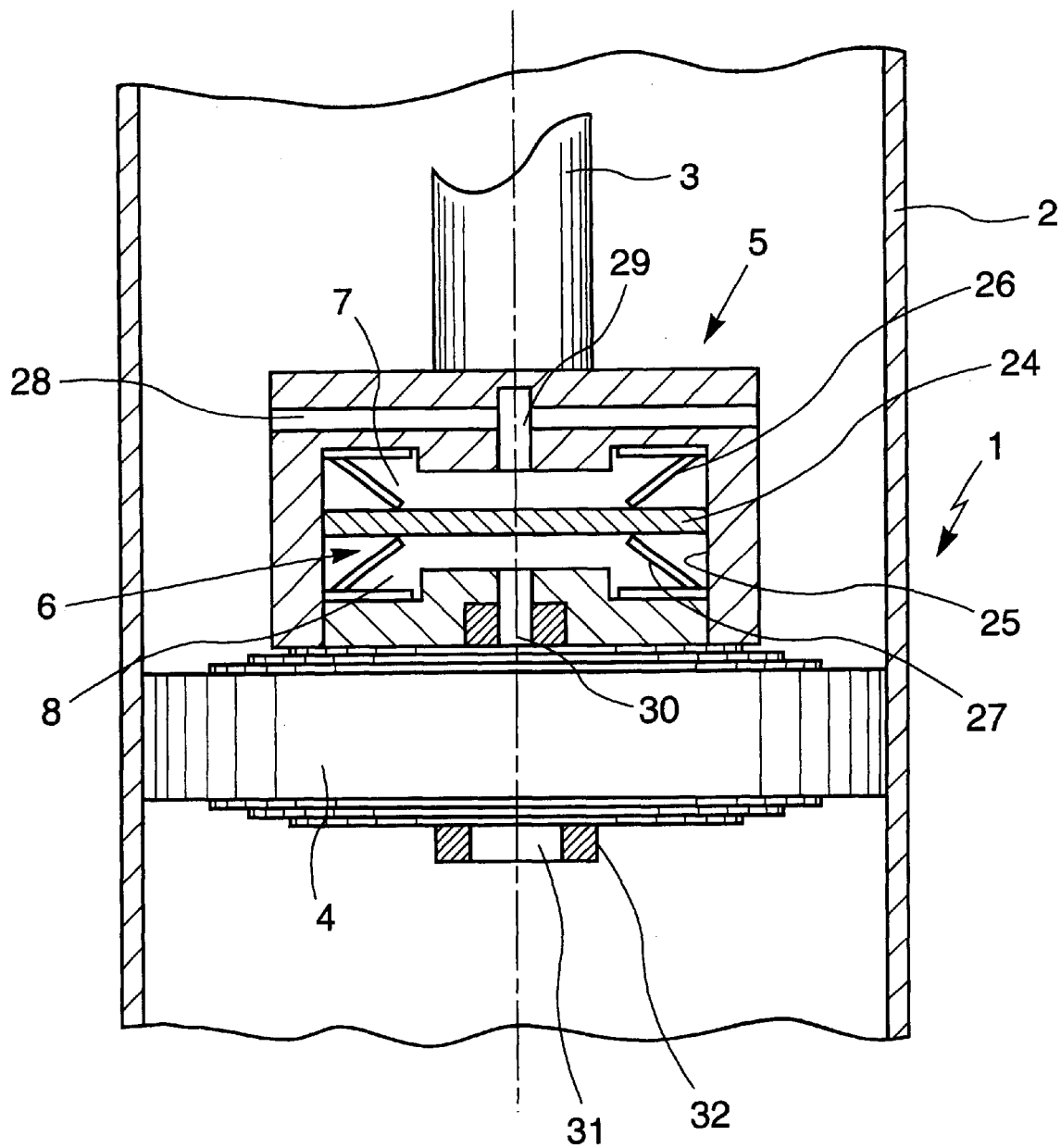
FIG. 3 is an illustration similar to FIG. 1 but with a different type of smaller-amplitude handling component.

The component 5 that handles smaller amplitudes in the embodiment illustrated in FIG. 3 is positioned between piston rod 3 and piston 4, in upper attenuating space 15, that is. The cylindrical space 6 inside component 5 is divided into two subsidiary spaces 7 and 8 by an axially displaceable disc 24, sealed off at its circumference from the space's inner surface 25. Springs 26 and 27, leaf springs in the present embodiment, retain disc 24 in midposition as long as the pressures in subsidiary spaces 7 and 8 are equal. Once the pressures differ, disc 24 will be displaced axially like the diaphragm 9 depicted in FIGS. 1 and 2.

Upper subsidiary space 7 communicates hydraulically with upper attenuating space 15 through bores 28 and 29, and lower subsidiary space 8 with lower attenuating space 17 through bores 30 and 31. Central bore 31 is accommodated in a threaded fastener 32 that connects piston 4 to component 5, which itself fastens to piston rod 3, conventionally again, by screwing on for example. The embodiment illustrated in FIG. 5, wherein the component 5 that handles smaller amplitudes is accommodated between piston rod 3 and piston 4, can be shorter and can accordingly be employed in a one-cylinder dashpot.

Figure 4:
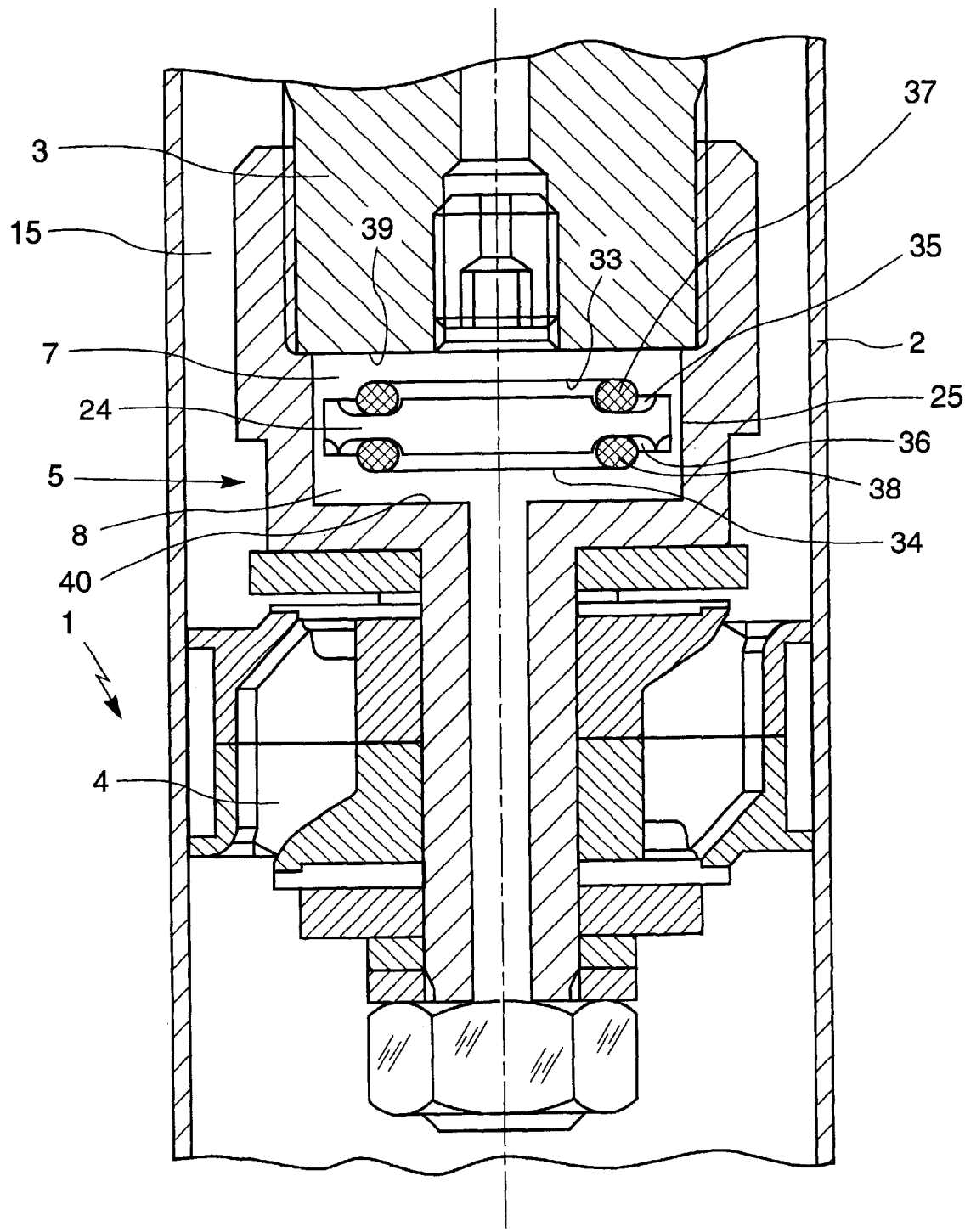
FIG. 4 is an illustration similar to that in FIG. 1 but with still another type of smaller-amplitude handling component.

In the embodiment illustrated in FIG. 4, the component 5 that handles smaller amplitudes is also accommodated between piston rod 3 and piston 4, inside upper attenuating space 15, that is. Space 6 is again divided into two subsidiary spaces 7 and 8 by an axially displaceable disc 24. This disc, however, is not sealed off at its circumference against the inner surface 25 of the cylindrical space, but a narrow gap between them. The advantage of this approach is that any bubbles of gas that accumulate below disc 24 can rise through the gap, the only way to ensure a reliable function on the part of component 5.

The embodiment illustrated in FIG. 4 needs no springs to maintain disc 24 half-way up. The disc is expected to assume that level itself during normal operation.

Each face 33 and 34 of the disc 24 depicted in FIG. 4 is bordered by an annular groove 35 and 36, each wider than it is deep and extending above the face. Each groove accommodates a resilient ring 37 and 38, which can be cemented or vulcanized to disc 24. When a face 33 or 34 is forced as powerfully as possible against one of the floors 39 and 40 of space 6, rings 37 and 38 will deform resiliently until they at least almost entirely occupy grooves 35 and 36. The resulting expansive force between faces 33 and 34 and floors 39 and 40 will release disc 24 from the floors as the hydraulic pressure decreases and possibly even restore the disc to the desired halfway-up level. Grooves 35 and 36 and rings 37 and 38 can be designed to ensure that disc 24 will rest weakly against the floors.

Rings 37 and 38 can also be integrated into faces 33 and 34, in the form for example of lips that can be curved into grooves 35 and 36. Disc 24 and rings 37 and 38 are preferably of plastic.

To prevent disc 24 from adhering to the floors of space 6, faces 33 and 34 and floors 39 and 40 can be uneven. These surfaces will preferably be provided with radial depressions.

If it is necessary to absolutely ensure that disc 24 remains in its rest position halfway up space 6 in the embodiment illustrated in FIG. 4, springs 26 and 27 similar to those employed in the embodiment illustrates in FIG. 3 can be provided in the former embodiment as well.

LIST OF PARTS 1. device
2. housing
3. piston rod
4. piston
5. component
6. space
7. subsidiary space
8. subsidiary space
9. diaphragm
10. blind bore
11. bore
12. bore
13. face
13. face
14. face
15. upper attentuating space
16. valve disc
17. lower attentuating space
18. valve disc
19. apertures
20. wall
21. annular space
22. apertures
23. wall
24. disc
25. inner surface
26. spring
27. spring
18. bore
29. bore
30. bore
31. bore
32. threaded fastener
33. face
34. face
35. groove
36. groove
37. ring
38. ring
39. floor
40. floor

What is claimed is:

1. An arrangement for attenuating impact amplitudes against a wheel of a vehicle, comprising: at least one piston traveling in a housing and dividing said housing into two attenuating spaces; a piston rod attached to said piston; a hydraulically parallel component operating in conjunction with said piston and handling smaller amplitudes; said component being a diaphragm or a displaceable rigid disk dividing a closed space and communicating hydraulically with one of said attenuating spaces or with the other one of said attenuating spaces, said one attenuating space being an upper space and said other attenuating space being a lower space; said disk having at least one face bordered by an annular groove holding a resilient ring extending above said face; said disk being displaceable in said closed space having a half portion connected with said attenuating spaces, so that attenuation of vibrations with small amplitudes is weak and said attenuation is actuated only when travels of said piston inside said housing are extensive.

2. An arrangement as defined in claim 1, wherein said groove is large enough to be at least almost entirely occupied while said disk rests against floors of said component axially demarcating said closed space.

3. An arrangement for attenuating impact amplitudes against a wheel of a vehicle, comprising: at least one piston traveling in a housing and dividing said housing into two attenuating spaces; a piston rod attached to said piston; a hydraulically parallel component operating in conjunction with said piston and handling smaller amplitudes; said component being a diaphragm or a displaceable rigid disk dividing a closed space and communicating hydraulically with one of said attenuating spaces or with the other one of said attenuating spaces, said one attenuating space being an upper space and said other attenuating space being a lower space; said disk having at least one face and one floor of said closed space that are uneven; said at least one face of said disk and said one floor of said closed space having radial depressions; said disk being displaceable in said closed space having a half portion connected with said attenuating spaces, so that attenuation of vibrations with small amplitudes is weak and said attenuation is actuated only when travels of said piston inside said housing are extensive.

4. An arrangement for attenuating impact amplitudes against a wheel of a vehicle, comprising: at least one piston traveling in a housing and dividing said housing into two attenuating spaces; a piston rod attached to said piston; a hydraulically parallel component operating in conjunction with said piston and handling smaller amplitudes; said component being a diaphragm or a displaceable rigid disk dividing a closed space and communicating hydraulically with one of said attenuating spaces or with the other one of said attenuating spaces, said one attenuating space being an upper space and said other attenuating space being a lower space; said component being formed by said diaphragm or said disk moveable freely without being controlled in said closed space, said smaller amplitudes having substantially low or no attenuation; said disk being displaceable in said closed space having a half portion connected with said attenuating spaces, so that attenuation of vibrations with small amplitudes is weak and said attenuation is actuated only when travels of said piston inside said housing are extensive.

5. An arrangement as defined in claim 4, wherein said closed space is cylindrical and said rigid disk is an axially displaceable disk dividing said closed space axially displaced.

6. An arrangement as defined in claim 5, wherein said disk is sealed off at a circumference of said disk against an inner surface of said closed space.

7. An arrangement as defined in claim 5, wherein a narrow gap is left between a circumference of said disk and an inner surface of said closed space.

8. An arrangement as defined in claim 4, including spring means for holding said disk axially in position within said closed space.

9. An arrangement as defined in claim 4, including elastomeric means for holding said disk axially in position within said closed space.

10. An arrangement as defined in claim 4, wherein said closed space is inside said component within said other attenuating space.

11. An arrangement as defined in claim 10, wherein said component is a nut operating in conjunction with said piston rod for tensioning valve disks.

12. An arrangement as defined in claim 4, wherein said closed space is inside said component within said one attenuating space.

13. An arrangement as defined in claim 12, wherein said component is between an end of said piston rod and said piston.

14. An arrangement as defined in claim 4, wherein said disk has at least one face and one floor of said closed space that are uneven.

15. An arrangement as defined in claim 4, wherein said diaphragm is of elastically deformable material.

16. An arrangement as defined in claim 4, wherein said diaphragm is of steel or an elastomer.

17. An arrangement as defined in claim 4, wherein said diaphragm creates subsidiary spaces with curved walls.

18. An arrangement as defined in claim 17, wherein said subsidiary spaces communicate hydraulically with said attenuating spaces through intake and outlet apertures.

19. An arrangement as defined in claim 18, wherein said component is located between a blind bore in said piston rod and said closed space or said apertures.

* * * * *